United States Patent
Overes et al.

(10) Patent No.: US 8,240,901 B2
(45) Date of Patent: *Aug. 14, 2012

(54) DISPLAY APPARATUS HAVING RIGHT-HAND AND LEFT-HAND ILLUMINATION UNITS

(75) Inventors: Theodorus Franciscus Emilius Maria Overes, Eindhoven (NL); Johannes Petrus Cornelis Maria Verhagen, Maarheeze (NL)

(73) Assignee: TP Vision Holding B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,486

(22) Filed: May 27, 2011

(65) Prior Publication Data

US 2011/0273908 A1    Nov. 10, 2011

Related U.S. Application Data

(62) Division of application No. 10/596,759, filed on Jun. 23, 2006, now Pat. No. 7,972,050.

(30) Foreign Application Priority Data

Jan. 7, 2004    (EP) ..................................... 04100024

(51) Int. Cl.
*F21V 7/04* (2006.01)
(52) U.S. Cl. ......... 362/555; 362/231; 362/147; 362/559
(58) Field of Classification Search .................. 362/231, 362/551, 555, 606–608, 26–27, 612, 616, 362/559–561, 285, 287, 418, 427; 345/102; 385/901
See application file for complete search history.

(56) References Cited

U.S. PATENT DOCUMENTS

| | | | |
|---|---|---|---|
| 5,211,463 A | 5/1993 | Kalmanash |
| 5,542,017 A | 7/1996 | Koike |
| 5,984,497 A | 11/1999 | Foerstner |
| 6,550,952 B1 | 4/2003 | Hulse |
| 6,561,661 B2 | 5/2003 | Egawa |
| 6,611,297 B1 | 8/2003 | Akashi |
| 6,655,825 B2 | 12/2003 | Muthu |
| 6,976,777 B1 | 12/2005 | Herold |
| 2001/0035853 A1 | 11/2001 | Hoelen |
| 2002/0041500 A1 | 4/2002 | Egawa |
| 2002/0131275 A1 | 9/2002 | Yamamoto |
| 2002/0159741 A1 | 10/2002 | Graves |
| 2003/0123245 A1 | 7/2003 | Parker |

FOREIGN PATENT DOCUMENTS

| | | |
|---|---|---|
| DE | 3629593 A1 | 3/1987 |
| DE | 4207417 A1 | 9/1993 |
| DE | 20002420 U1 | 6/2000 |
| EP | 0272053 A2 | 6/1988 |
| EP | 0965018 B1 | 12/1999 |
| EP | 1016817 A1 | 5/2000 |
| EP | 1376003 A1 | 1/2004 |

(Continued)

*Primary Examiner* — Thomas Sember
(74) *Attorney, Agent, or Firm* — Shimokaji & Assoc., PC

(57) ABSTRACT

The invention relates to a display apparatus with a display unit, having means for background lighting at the back of the display apparatus. According to the invention, the means for background lighting comprise two illumination units being provided at the right-hand and left-hand of the display apparatus, said illumination units being formed as substantially vertically positioned, longitudinal light guides comprising means for coupling out light, each of the light guides being provided on at least one of its ends with a light source. The light sources preferably comprise colored LEDs.

3 Claims, 3 Drawing Sheets

FOREIGN PATENT DOCUMENTS

| | | | |
|---|---|---|---|
| FR | 1323696 | A1 | 7/1963 |
| JP | 04007506 | A | 1/1992 |
| JP | 3023030 | | 4/1996 |
| JP | 3023031 | | 4/1996 |
| JP | 3023032 | | 4/1996 |
| JP | 10177807 | A1 | 6/1998 |
| JP | 2000173783 | A | 6/2000 |
| JP | 2000268617 | | 9/2000 |
| JP | 2003257205 | A | 9/2003 |
| WO | 0250473 | A1 | 6/2002 |
| WO | 03048635 | A1 | 6/2003 |

DISPLAY APPARATUS HAVING RIGHT-HAND AND LEFT-HAND ILLUMINATION UNITS

This application is a Divisional of prior U.S. patent application Ser. No. 10/596,759, filed Jun. 23, 2006, now U.S. Pat. No. 7,972,050, which claims the benefit of European Application No. 04100024.1 filed Jan. 7, 2004, the entire contents of each of which is incorporated herein by reference thereto.

The invention relates to a display apparatus with a display unit, having means for background lighting at a side or the back of the display apparatus.

Such a display apparatus is known i.a. from the Utility Model publication DE 20002420. This publication discloses a simple back lighting system with limited back lighting possibilities.

The present invention aims at providing an improved display apparatus. To this end, the invention provides a display apparatus as defined in claim 1. Devices having the claimed features show a much greater impact on the viewer than the prior art display apparatus with the limited back lighting possibilities. This holds especially for display apparatus having a wide-screen display unit.

The display apparatus according to the present invention has at least two illumination units, which are preferably attached to the back of the apparatus. In a preferred embodiment of two units, the one unit is provided on the left-hand side of the apparatus and the other unit on its right-hand side. The units are formed as longitudinal light guides, preferably of a synthetic resin, like acrylic resin, which can be prepared by extrusion. The guides in principle can have a cross section of any desired shape, but preferably have a circular cross section. As the guides are positioned substantially vertical, they are attached to the apparatus in a mutually parallel orientation. The display apparatus may have (an) additional illumination unit(s) on top and/or bottom side(s) of the display apparatus. Latter light guides are positioned substantially horizontal.

The light guides employed in the display apparatus according to the present invention comprise means for coupling out light. It is possible to use a reflecting body encapsulated in an extruded light guide. Preferably the means for coupling out light are formed as a structure provided on the surface of the light guide. This can be obtained by sandblasting part of the surface of the light guide according to a desired structure. Alternatively, good results are also obtained by printing a diffuse reflective layer on the surface of the light guide, or by applying it by means of a sticker. Under these circumstances, it is preferred if the light guides contain a flat outer surface on which the desired structure can be applied.

It is noted that different structures for coupling out light from the light guide can be used. Seen in the length direction of the guide, the structure can be continuous or discontinuous ('zebra' or 'dotted' form). In case that one light source is used, the width of a continuous structure should increase at increased distance from the light source in order to obtain a continuous light output along the whole length of the light guide. In case that each of the light guides is provided with a light source at both of its ends, the width of the continuous structure will be maximal in the middle of the light guide in order to have the continuous light output along the length of the light guide. In case that a discontinuous pattern is used (stripes or dots), a continuous width of the stripes or dots with different pitch lengths between subsequent stripes or dots can be used in order to obtain the desired continuous light output.

An interesting display apparatus according to the present invention is characterized in that that the light guides are rotatable along a longitudinal axis. This feature allows adjustment of the back lighting pattern on wall. This is particularly useful in case that the screen of the display apparatus is positioned not parallel to the back wall, but under a certain angle. In such situation, the user can rotate the light guides in such way that under operation of the back lighting a spot on the wall is obtained which is well balanced on both sides of the display apparatus. By means of this feature, the desired impact on the viewer is maintained, even when the display apparatus is positioned under an angle with respect to the back wall.

Another advantageous embodiment of the invented display is characterized in that the display apparatus comprises means for controlling the colour of the backlight and that the light guides are provided on both ends with a light source, said light source comprising a red, a green and a blue LED. By means of this embodiment, the display unit may produce light, the colour and light intensity of which can be adapted in order to fit is optimally with the colour of the room in accordance with the wishes of the user.

Interesting is also the embodiment which is characterized in that the display apparatus comprises a control circuit for controlling the colour of each of the light sources in dependence of a colour of a part of the display screen which is close to the light source. With display apparatus having this feature seem to project an additional part of the scene displayed on the apparatus in a dynamic way on the back wall. It has been shown that the dynamic spot displayed on the wall induces an extraordinary great impact on the viewer, as in this way the scene observed seems to be increased.

These and other aspects of the invention will be apparent from and elucidated with reference to the embodiments described hereinafter and a drawing, in which.

The Figures are purely diagrammatic and not drawn true to scale. Dimensions may be exaggerated for reasons of clarity. In the Figures equivalent parts have been given as much as possible the same reference number.

Figure 1:
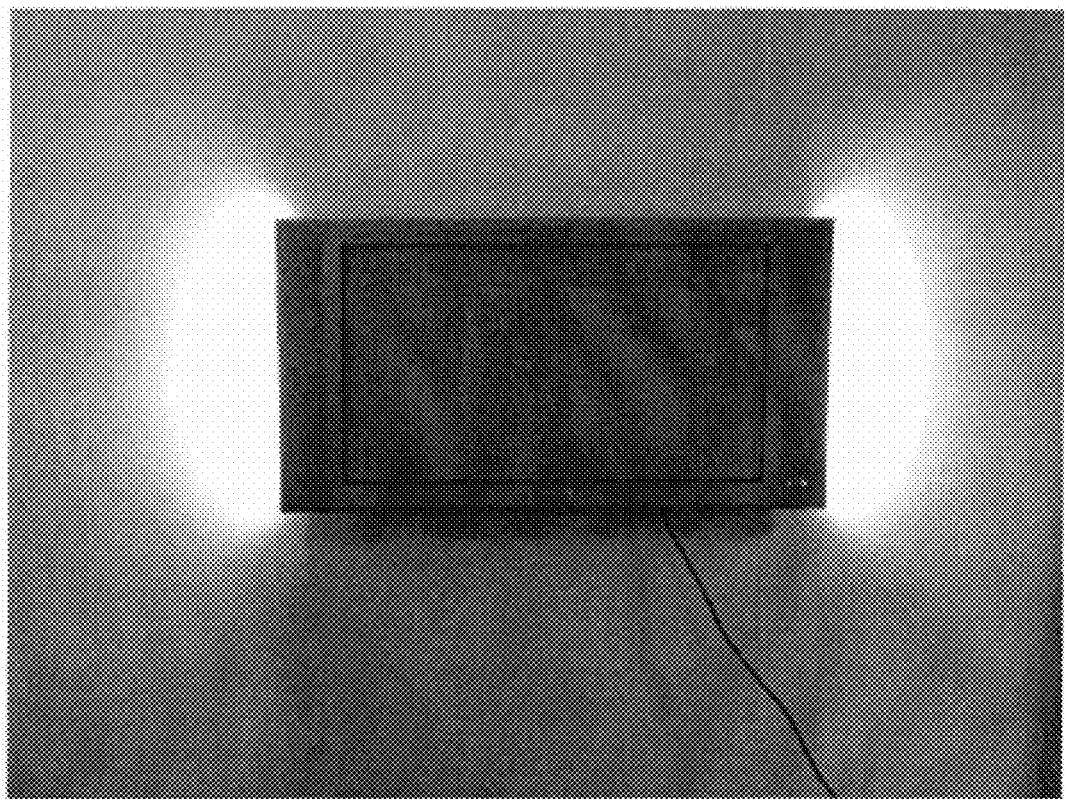
FIG. 1 shows an embodiment of a display apparatus according to the present invention.
Figure 2:
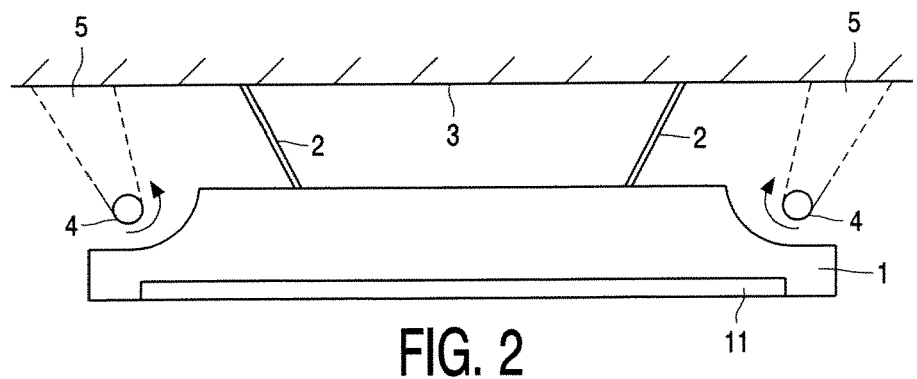
FIG. 2 shows a schematic top view of the display apparatus according to the invention as shown in FIG. 1.

The display apparatus (1) as shown in FIGS. 1 and 2 is preferably mounted by mounting means (2) to a wall (3) of a room. According to the present invention, attached to its back, the display apparatus comprise two illumination units (4) for providing a background light formed as two spots (5) on wall (3). These spots (5) are displayed at the left-hand side and the right-hand side of the display apparatus. Usually they are only displayed during operation of the display apparatus. However it is also possible to display them during the time that the display apparatus is switched off.

Figure 3A:
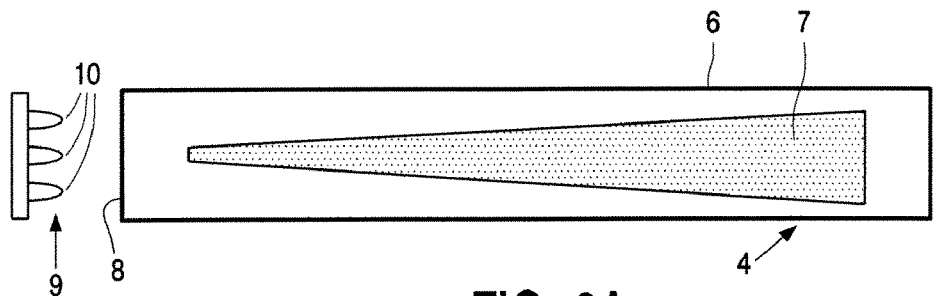
FIG. 3 shows a detail of the display apparatus according to the invention as depicted in FIG. 1.
Figure 3B:
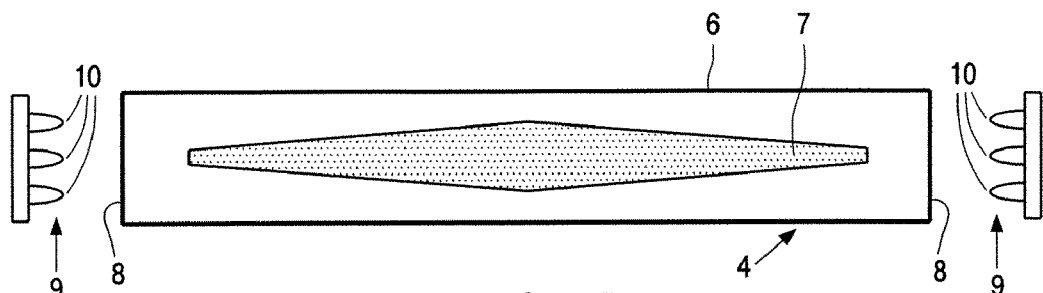
Figure 3C:
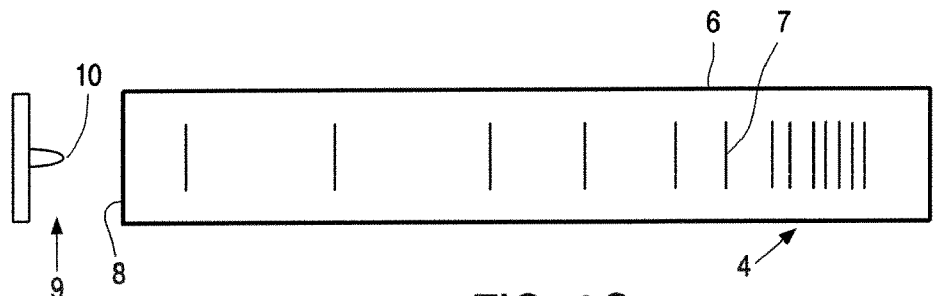

FIG. 3-A shows a front view of an illumination unit (4), which can be used in the display apparatus according to the present invention. The unit comprises longitudinal light guide (6) having a cylindrical form. The surface of the unstructured light guide is polished in order to prevent coupling out of light inserted in the guide during operation. In the present case, the light guide is made of an acrylic resin (PMMA, poly-methyl-methacrylate) by means of extrusion. On a flat part of its surface, a longitudinal structure (7) is prepared by means of printing. This structure causes that part of the light being inserted in the guide is coupled out. Light can be coupled in at a flat end (8) of the light guide by means of light source (9). This light source can be an incandescent lamp or a halogen lamp. However, it is preferred to use one or more LEDs (10) for this purpose. In the present embodiment the light source consists of a set of three LEDs (10), the individual LEDs emitting Red, Blue and Green light.

During operation of the illumination unit (4), a certain amount of light enters the light guide (6) generated by LEDs (10) via flat end (8). By means of longitudinal structure (7) part of the inserted light is coupled out of the light guide in a direction substantially perpendicular to the longitudinal axis of the light guide (6). In order to keep the amount of light coupled out substantially constant over the whole length of the guide, the width of the coupling out structure increases as the distant from the light source to the coupling out area increases.

FIG. 3-B shows an alternative illumination unit (4), which comprises two light sources (9) per light guide (6). Again in this example the use of LEDs as light source are preferred over the use of alternative light sources. In order to achieve a constant out coupling of light during operation of the light guide, the width of the applied coupling out structure is maximal in the middle of the light guide.

FIG. 3-C shows another alternative illumination unit (4), which comprises a single light source (6) having a single Blue LED (10). In this example a discontinuous, zebra-like coupling out structure (7) is used in order to keep the light output constant along the length of the light guide. This structure is prepared by sandblasting the desired lines of the coupling out structure in the coupling out light guide. In this embodiment, the lines have equal width and equal length. The person skilled in the art can of course design alternative structures in which the lines have different length and widths and in which the distance between neighbouring lines are adjusted to these alternative structures.

In general, the structure is applied in such way that the light beam coupled out from the light guide emits under an angle of 50-90 degrees. An optimal effect is however reached in case that said angle is 70 degrees with a deviation of maximally 10 degrees, preferably 5 degrees.

Returning to FIG. 2, it is stressed that the illumination units (4) can be rotated along the longitudinal axis of the light guides, as indicated by the arrows. In case that the display apparatus is positioned under an angle with respect to the wall (i.e. the plane of the screen of the display apparatus is not parallel to the plane of the wall), the light spots (5) displayed on the wall during operation of the apparatus can be adjusted manually by the user in order to give them an optimal shape. This holds both for TV-sets or monitors that are attached to the wall and for apparatus standing free of the wall. In practise the light guides can be clamped in one or more settings, which allows rotation of the guides along their longitudinal axis.

Figure 4:
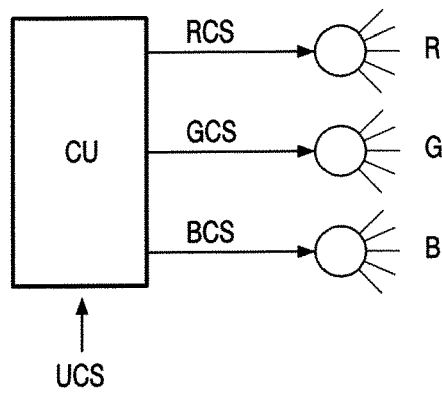
FIG. 4 shows a block diagram of a first embodiment of a control circuit for use in a display apparatus according to the invention.

The display indicated comprises means for controlling the colour of the backlight. The colour produced by the illumination unit of a display apparatus without such controlling means can be neutral white or a static colour. However it is preferred that the illumination unit produces during operation coloured light, the wavelength and brightness of which can be adjusted by the user according to his wishes. To this end, the display apparatus has a control unit CU that produces red, green and blue control signals RCS, GCS, BCS that control red, green and blue LEDs (10) of the illumination units (4). The control unit CU receives a user control signal UCS (that may be produces by a remote control signal reception device) to set the colour in such a manner that it fits in with the wish of the user. A block diagram for this embodiment is shown in FIG. 4. While the illumination unit preferably employs LEDs, other light sources may also be used instead in alternative embodiments. The control unit may receive a signal from a light sensor so as to make the light from the illumination unit dependent on ambient light as well.

Figure 5:
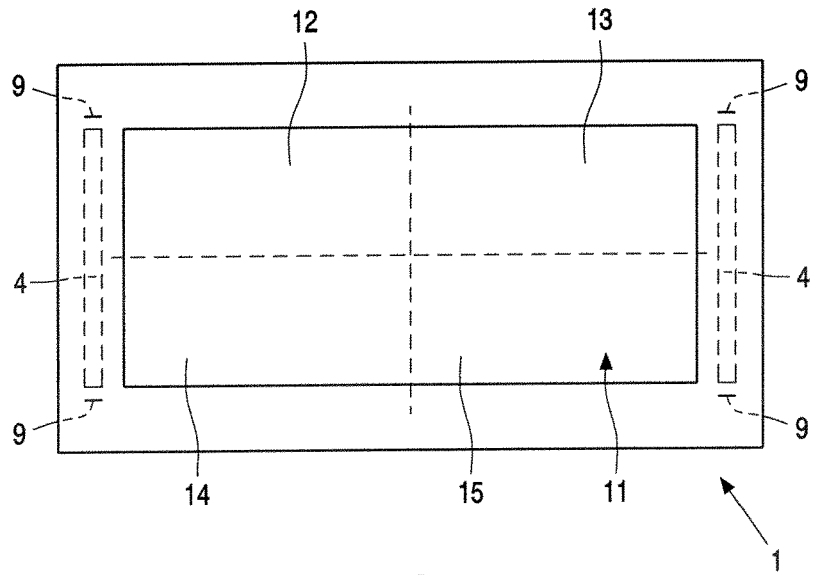
FIG. 5 shows another embodiment of a display apparatus according to the present invention.

FIG. 5 shows a further interesting embodiment of a display according to the present invention, which is characterized in that the display apparatus comprises a control circuit for controlling the colour of each of the light sources in dependence of a colour of a part of the display screen, which is close to the light source. More particularly it shows a front view of a display apparatus (1) with a display screen (11) and two illumination units (4) on the left-hand and the right-hand side of the apparatus. Each of the illumination units (4) comprises a longitudinal light guide with a light source (9) on each of both ends of the light guides. Said light sources are composed of three LEDs emitting blue, green and red light.

The display apparatus also comprises a circuit for controlling the colour of the light sources. To this end, the display apparatus has a control unit CU that produces red, green and blue control signals RCS, GCS, BCS that control the average colour produced by the red, green and blue LEDs (10) of one of the four light sources of the two illumination units (4). The control unit CU receives a control signal UCS to set the colour of one of the light sources, which signal is dependent on the average colour of one of the segments (12), (13), (14) or (15) of screen (11) or of a part thereof. Thus the produced colour of the light source of each of the four light sources is dependent on the average colour of the segment, which is closest to the light source. It is stressed that not only an average colour can be selected in this way, but also a dominant colour, this all upon the wish of the user.

Due to colour mixing in the longitudinal light guides, a smooth colour transition between both ends of the light guides is obtained. Thus in case of a picture of the beach, both top segments 12 and 13 are essentially blue and the light sources on top of both light guides will produce essentially blue light. Both bottom segments are however essentially yellow, and the light sources on bottom of both light guides will produce essentially yellow light. In the light guides a transition from top (blue) to bottom (yellow) is obtained for such picture. This colour transition is displayed on the wall. It appears that this kind of dynamic back lighting in a display causes a very impressive impact on the viewer. It essentially broadens the width of the scene displayed on the display apparatus.

It should be noted that the above-mentioned embodiments illustrate rather than limit the invention, and that those skilled in the art will be able to design many alternative embodiments without departing from the scope of the appended claims. In the claims, any reference signs placed between parentheses shall no be construed as limiting the claim. Use of the verb 'comprise' and it conjugations does not exclude the presence of elements or steps other than those stated in a claim. The article 'a' or 'an' preceding an element does not exclude the presence of a plurality of such elements. The invention may be implemented by means of hardware comprising several distinct elements and by means of a suitable programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display apparatus (1) with a display unit (11), comprising means for background lighting at a side or the back of the display apparatus (1), said means for background lighting comprise two illumination units (4) being provided at the right-hand and left-hand of the display apparatus (1), said illumination units (4) being formed as substantially vertically positioned, longitudinal light guides (6) comprising means for coupling out light, each of the light guides (6) being provided on both ends with a light source (9), wherein the display apparatus (1) further comprises means for controlling the color of the background lighting, and a control circuit for controlling the color of each of the light sources (9) in dependence of a color of a part of the display unit (11) which is close to the light source (9), characterized in that the light sources (9) are individually controlled for outputting different colors at each end of the light guides (6) so as to achieve a color mixing in the light guides (6).

2. A display apparatus (1) according to claim 1, wherein the means for coupling out light are formed as a structure provided on the surface of the light guide (6).

3. A display apparatus (1) according to claim 2, wherein the light guides (6) are rotatable along a longitudinal axis.

* * * * *